US005852147A

United States Patent [19]

Yoo et al.

[11] Patent Number: 5,852,147

[45] Date of Patent: Dec. 22, 1998

[54] PROCESS FOR PREPARING DEODORIZED RESIN FOR DRY TONER

[75] Inventors: Jin-Nyoung Yoo; Myung-Man Kim; Yeong-Rae Chang, all of Daejeon, Rep. of Korea

[73] Assignee: LG Chemical Ltd., Seoul, Rep. of Korea

[21] Appl. No.: 765,022

[22] PCT Filed: May 2, 1996

[86] PCT No.: PCT/KR96/00065

§ 371 Date: Dec. 26, 1996

§ 102(e) Date: Dec. 26, 1996

[87] PCT Pub. No.: WO96/35148

PCT Pub. Date: Nov. 7, 1996

[30] Foreign Application Priority Data

May 2, 1995 [KR] Rep. of Korea .................... 95-10694

[51] Int. Cl.[6] .................................................. C08F 2/38

[52] U.S. Cl. ...................... 526/224; 528/491; 526/329.2

[58] Field of Search ............................ 526/224; 528/491

[56] References Cited

U.S. PATENT DOCUMENTS

| | | | |
|---|---|---|---|
| 3,928,498 | 12/1975 | Uraneck et al. | 526/224 |
| 4,754,008 | 6/1988 | Sid et al. | 526/224 |
| 5,521,268 | 5/1996 | Ghyzel et al. | 526/224 |

FOREIGN PATENT DOCUMENTS

| | | | |
|---|---|---|---|
| 0003957 | 9/1979 | European Pat. Off. | 528/491 |
| 1231013 | 12/1966 | Germany | 526/224 |
| 4332701 | 11/1992 | Japan | 526/224 |

*Primary Examiner*—Bernard Lipman
*Assistant Examiner*—N. Sarofim
*Attorney, Agent, or Firm*—Anderson, Kill & Olick, P.C.

[57] ABSTRACT

A process for preparing a deodorized resin for a dry toner which comprises: (a) polymerizing an aromatic vinylic monomer and an acrylic monomer in the presence of a molecular weight-controlling agent, an initiator and an emulsifier using a two-step emulsion polymerization process to obtain a latex having a bimodal molecular weight distribution; and (b) treating the latex with an oil-soluble peroxide.

9 Claims, No Drawings

PROCESS FOR PREPARING DEODORIZED RESIN FOR DRY TONER

FIELD OF THE INVENTION

The present invention relates to a process for preparing a deodorized resin for a dry toner. More particularly, it pertains to a process for preparing a deodorized resin for a dry toner, which comprises polymerizing an aromatic vinylic monomer and an acrylic monomer in the presence of a molecular weight-controlling agent, an initiator and an emulsifier using a two-step emulsion polymerization process to obtain a latex having a bimodal molecular weight distribution; and treating the latex with an oil-soluble peroxide.

BACKGROUND OF THE INVENTION

A binder resin for a copying machine toner should have a viscosity suitably adjusted to the copying speed of the machine; in particular, a toner for use in a high-speed copying machine requires a resin having a low viscosity and containing no gel. In order to have a low viscosity, the resin should have a sufficiently low molecular weight, and, to accomplish this, an excessive amount of molecular weight-controlling agent is usually added to the resin to lower its molecular weight. Because many of the molecular weight-controlling agents, e.g., mercaptans, release unpleasant sharp odors, the unreacted molecular weight-controlling agent remaining in the final product causes a toner to emit a bad smell. Unreacted monomers remaining in the resin are also considered to be the source of bad odors.

Hitherto, various methods for preparing a deodorized resin for a toner have been developed and reported.

U.S. Pat. No. 5,268,431 discloses an ozonizing method which comprises polymerizing diene monomer and styrene to obtain a copolymer and treating the copolymer with ozone to cut the double bond of the diene, thereby lowering the molecular weight of the copolymer without employing an excess amount of a molecular weight-controlling agent.

Japanese Patent No. 05-150545 discloses a process for preparing a deodorized resin by raising the reaction temperature after polymerization to bring the reactions of the foul smelling unreacted monomers to completion.

Japanese Patent No. 05-142860 discloses a process for preparing a deodorized resin by irradiating an electron beam on the residual monomers after polymerization, thereby generating radicals to complete the reaction of the monomers.

U.S. Pat. No. 5,342,722 reports a process for preparing a deodorized resin by using an odorless α-methylstyrene dimer as a molecular weight-controlling agent.

On the other hand, Japanese Patent No. 05-216272 discloses a process for preparing a deodorized toner by adding a terpene or a flavor to a resin for a toner.

However, the above methods have problems in that the reaction or work-up process is complicated, the process time unduly long, and/or an additional cost is incurred due to the use of a molecular weight-controlling agent having a low reactivity.

Therefore, there has continued to exist a need for a simple, effective process for the preparation of a deodorized resin for a dry toner.

SUMMARY OF THE INVENTION

Accordingly, it is a primary object of the present invention to provide a simple, effective process for the preparation of a deodorized resin for a dry toner.

In accordance with one aspect of the present invention, there is provided a process for preparing a deodorized resin for a dry toner, which comprises polymerizing an aromatic vinylic monomer and an acrylic monomer in the presence of a molecular weight-controlling agent, an initiator and an emulsifier using a two-step emulsion polymerization to obtain a latex having a bimodal molecular weight distribution; and treating the latex with an oil-soluble peroxide initiator.

DETAILED DESCRIPTION OF THE INVENTION

Generally, a binder resin for a toner is polymerized by any one of the conventional methods, e.g., an emulsion polymerization, a suspension polymerization, a solution polymerization or a bulk polymerization. In the present invention, a two-step emulsion polymerization method is employed.

The two-step emulsion polymerization of the present invention comprises a first step polymerization to obtain a high molecular weight latex and a second step polymerization to obtain a low molecular weight latex; or alternatively, the two steps can be carried out in reverse order.

The first step comprises an emulsion polymerization of a composition containing monomers, an initiator, an emulsifier and a molecular weight-controlling agent. The latex prepared in the first step is added into a reaction vessel of the second polymerization step before the second polymerization step is initiated.

The second polymerization step comprises another emulsion polymerization which is carried out in the presence of the latex prepared in the first step using the same monomers as used in the first step. In case when a low molecular weight latex was prepared in the first step, a high molecular weight latex is prepared in the second step, and vice versa. The weight ratio of the composition used in the second step to the latex prepared in the first step ranges from 2:8 to 8:2, preferably, 3:7 to 7:3.

When the reaction is completed, the resulting latex has a bimodal molecular weight distribution wherein the peak molecular weight(Mw) of the low molecular weight part ranges from 3,000 to 20,000 daltons and the peak Mw of the high molecular weight part ranges from 20,000 to 1,000,000 daltons.

A toner suitable for the heat fixing method should easily melt at a low temperature, should have an excellent fixability to paper, and should have good non-offset property, i.e., it should not adhere to hot rollers. In order to satisfy both the fixability and non-offset property requirements, a polymer for use in a toner preferably has a bimodal molecular weight distribution.

For use as monomers in producing a resin of the present invention, a mixture of an aromatic vinylic monomer and an acrylic monomer is preferably used. An aromatic vinylic resin has an excellent electrostatic property. Moreover, an aromatic vinyl and acrylic copolymer resin has a melting point which can be controlled over a broad range of temperature and imparts a good fixability to a toner.

Exemplary aromatic vinylic monomers for use in the present invention include styrene, monochlorostyrene, methylstyrene and dimethylstyrene, and the amount thereof ranges preferably from 30 to 90 parts by weight on the basis of the total weight of the monomeric mixture.

One or more acrylic monomers may be used in the present invention; representatives thereof include acrylates, e.g., methyl acrylate, ethyl acrylate, n-butyl acrylate, isobutyl acrylate, dodecyl acrylate and 2-ethylhexyl acrylate; and methacrylates, e.g., methyl methacrylate, ethyl methacrylate and n-butyl methacrylate. The amount of the acrylic monomers that may be used in the present invention ranges preferably from 10 to 70 parts by weight on the basis of the total weight of the monomeric mixture.

One or more mercaptanic molecular weight-controlling agents may be used in the present invention. Suitable mercaptans include t-dodecyl mercaptan and n-dodecyl mercaptan. The molecular weight-controlling agent may be used in an amount ranging from 0.001 to 1.0 parts by weight, preferably, 0.001 to 0.8 parts by weight, per 100 parts by weight of the total monomeric mixture in case a high molecular weight latex is being produced, and from 1.0 to 8.0 parts by weight, preferably, 2.0 to 7.0 parts by weight, per 100 parts by weight of the total monomeric mixture in case a low molecular weight latex is being produced.

A water-soluble initiator may be used in the present invention; useful initiators include the conventional ones used in an emulsion polymerization, e.g., persulfates such as potassium persulfate and ammonium persulfate; hydrogen peroxide; and a redox system. The initiator may be used in an amount ranging from 0.05 to 3.0 parts by weight, preferably, 0.1 to 2.0 parts by weight, per 100 parts by weight of the monomeric mixture.

An anionic or nonionic surfactant may be used as an emulsifier in the present invention. Examples thereof include: alkylallyl sulfonic acid, alkyl sulfonic acid, alkyl sulfonate, rosinates such as potassium rosinate and sodium rosinate, and fatty acid salts such as potassium oleate and potassium stearate. The amount of the emulsifier used may range from 0.1 to 3.0 parts by weight per 100 parts by weight of the monomeric mixture.

In the polymerization process to obtain a latex having a bimodal molecular weight distribution, the first and the second step polymerization reactions may be carried out at a temperature ranging from 40° C. to 95° C., preferably from 60° C. to 90° C. If the reaction temperature is lower than 40° C., the reaction hardly proceeds, and if higher than 95° C., it is impossible to control the polymer properties due to difficulties in regulating the heat of reaction. The reaction time may vary in accordance with the reaction temperature, and preferably ranges from 2 to 15 hours.

The latex finally produced in the above polymerization steps is subjected to a work-up process in order to deodorize it. Specifically, an oil-soluble initiator is added to the latex, and the mixture is reacted at a temperature ranging from 80° C. to 90° C. for a period ranging from 1 to 2 hours with stirring to lower the contents of both the residual monomers and molecular weight-controlling agents, which are considered to be the causes of the ill odor.

Exemplary oil-soluble initiators for use in the present invention include peroxides such as cumene hydroperoxide, diisopropyl toluene hydroperoxide, lauroyl peroxide and cymene hydroperoxide, and the amount thereof may range from 0.001 to 0.50 parts by weight per 100 parts by weight of the polymer in the latex.

After treatment with an oil-soluble initiator, the latex is coagulated in accordance with a conventional method, filtered and then dried to obtain a resin in a white powder form.

A toner may be prepared using the deodorized resin by a process which comprises: mixing a magnetite and a charge-controlling agent with the resin; extruding the resulting mixture using a twin-screw extruder; cooling and pulverizing the extrudate by a jet mill.

The degree of odor emitted by the toner, thus prepared, may be evaluated during the extrusion process by ten persons well skilled in the art of toner processing. Toners are scored zero point when they emit no odor and scored from one to ten points according to the degree of the odor, and the measured points are compared with each other. The result of such evaluation confirmed that the ill odor of a toner can be efficiently removed by the method of the present invention.

The following Examples are intended to further illustrate the present invention without limiting its scope.

Further, percentages given below for solid in solid mixture, liquid in liquid, and solid in liquid are on a wt/wt, vol/vol and wt/vol basis, respectively, unless specifically indicated otherwise.

EXAMPLE 1

Into a 500 ml flask were added 100 ml of water, 1 g of sodium lauryl sulfate, 80 g of styrene, 20 g of butyl acrylate, 0.01 g of n-dodecyl mercaptan and 1 g of potassium persulfate, and the mixture was stirred at 80° C. for 7 hours.

300 g of the resulting latex was introduced into a 2 l flask, and 70 g of styrene, 30 g of butyl acrylate, 1 g of sodium lauryl sulfate, 5 g of n-dodecyl mercaptan, 100 ml of water and 1 g of potassium persulfate were added thereto, followed by stirring at 90° C. for 7 hours to obtain a latex.

Just after the reaction was completed, 0.03 g of lauroyl peroxide was added to the latex and the mixture was stirred at 90° C. for 1 hour.

EXAMPLE 2

To a 500 ml flask were added 100 ml of water, 1 g of sodium lauryl sulfate, 80 g of styrene, 20 g of 2-ethylhexyl acrylate, 0.01 g of t-dodecyl mercaptan and 1 g of potassium persulfate, and the mixture was stirred at 80° C. for 7 hours.

300 g of the resulting latex was transferred to a 2 l flask, and 70 g of styrene, 30 g of 2-ethylhexyl acrylate, 1 g of sodium lauryl sulfate, 5 g of t-dodecyl mercaptan, 100 ml of water and 1 g of potassium persulfate were added thereto, followed by stirring at 90° C. for 7 hours to obtain a latex.

Just after the reaction was completed, 0.03 g of lauroyl peroxide was added to the latex and the mixture was stirred at 90° C. for 1 hour.

EXAMPLE 3

The same procedure as described in Example 1 was repeated except that the amount of lauroyl peroxide used was 0.06 g.

EXAMPLE 4

The same procedure as described in Example 2 was repeated except that the amount of lauroyl peroxide used was 0.06 g.

EXAMPLE 5

The same procedure as described in Example 1 was repeated except that 0.03 g of diisopropyltoluene hydroperoxide was employed in place of lauroyl peroxide.

COMPARATIVE EXAMPLE 1

A latex was prepared in accordance with the same procedure as described in Example 1, except that the treatment using lauroyl peroxide was omitted.

COMPARATIVE EXAMPLE 2

A latex was prepared in accordance with the same procedure as described in Example 2, except that the treatment using lauroyl peroxide was omitted.

COMPARATIVE EXAMPLE 3

The same procedure as described in Example 1 was repeated except that 5 g of potassium persulfate was employed in place of lauroyl peroxide.

COMPARATIVE EXAMPLE 4

The same procedure as described in Example 2 was repeated except that 5 g of potassium persulfate was employed in place of lauroyl peroxide.

COMPARATIVE EXAMPLE 5

A latex was prepared in accordance with the same procedure as described in Example 5, except that the treatment using diisopropyltoluene hydroperoxide was omitted.

TEST EXAMPLE 1

Determination of Molecular Weight of Latex

The molecular weight distribution of the polymers obtained from the latices prepared in Examples 1 to 5 and Comparative Examples 1 to 5 were determined by using a Gel Permeation Chromatograph(GPC, Waters) and the results are shown in Table I.

Each of the polymers had a bimodal molecular weight distribution, and the treatment with an oil-soluble initiator brought about no significant changes in the molecular weight distribution. The difference in the peak molecular weights of the polymers of Examples 1 and 2 is attributable to the use of different molecular weight-controlling agents.

TABLE I

| Molecular weight of Latex | | |
|---|---|---|
| | Low Molecular Weight Part (peak Mw) | High Molecular Weight Part (peak Mw) |
| Example 1 | 12,000 | 600,000 |
| Example 2 | 10,000 | 500,000 |
| Example 3 | 11,800 | 590,000 |
| Example 4 | 10,200 | 495,000 |
| Example 5 | 12,300 | 601,000 |
| Comparative Example 1 | 12,000 | 610,000 |
| Comparative Example 2 | 9,900 | 500,000 |
| Comparative Example 3 | 12,100 | 601,000 |
| Comparative Example 4 | 10,000 | 501,000 |
| Comparative Example 5 | 11,900 | 600,100 |

TEST EXAMPLE 2

Estimation of Degree of Odor of Toner

The degrees of odor of the toners prepared by using the latices prepared in Examples 1 to 5 and Comparative Examples 1 to 5 were measured as follows.

100 parts by weight of a magnetite(KBC 100, Kanto Denka, Japan) and 3 parts by weight of a charge controlling agent(Boltron P-51, Sanyo Kasei, Japan) were added to 100 parts by weight of the polymer obtained from each latex and the resulting powder mixture was extruded using a twin-screw extruder(LEISTRITZ, Germany). The extrudate was cooled and then pulverized by a jet mill to produce a toner.

The odor emitted during the extrusion step was evaluated by ten persons well skilled in the art of toner processing. Toners emitting no odor were scored zero, while others were scored from one to ten points according to their degree of odor. The result is shown in Table II.

TABLE II

| Resin for Toner | Degree of Odor | Resin for Toner | Degree of Odor |
|---|---|---|---|
| Example 1 | 2.2 | Comparative Example 1 | 9.4 |
| Example 2 | 2.1 | Comparative Example 2 | 9.5 |
| Example 3 | 1.2 | Comparative Example 3 | 8.4 |
| Example 4 | 1.1 | Comparative Example 4 | 8.5 |
| Example 5 | 3.0 | Comparative Example 5 | 9.6 |

As can be seen from the result, the degree of odor of a toner was remarkably reduced when it was prepared by employing a latex treated with lauroyl peroxide or diisopropyltoluene hydroperoxide. The toner prepared by using a latex treated with diisopropyltoluene hydroperoxide (Example 5) had a higher degree of odor than those prepared by treated with lauroyl peroxide(Example 1, 2, 3 or 4). This is due to the odor of diisopropyl toluene hydroperoxide itself.

Further, when a water-soluble initiator, i.e., potassium persulfate, was used in the treatment of a latex, the degree of odor remained at a high level, i.e., a water-soluble initiator is not as effective as an oil-soluble initiator. This result suggests that lipophilic residual monomers or molecular weight-controlling agents remaining in the polymer latex particle after the reaction react more easily with an oil-soluble initiator than with a water-soluble initiator.

While the invention has been described with respect to the above specific embodiments, it should be recognized that various modifications and changes may be made to the invention by those skilled in the art which also fall within the scope of the invention as defined by the appended claims.

What is claimed is:

1. A process for preparing a deodorized resin for a dry toner, comprising the steps of:

(a) polymerizing a monomeric mixture of an aromatic vinylic monomer and an acrylic monomer in the presence of a molecular weight-controlling agent, an initiator and an emulsifier in a two-step emulsion polymerization process to obtain a latex having a high molecular weight part and a low molecular weight part, wherein the amounts of the molecular weight-controlling agent used in the steps of preparing the high molecular weight part and the low molecular weight part range from 0.001 to 1.0 part and from 1.0 to 8.0 parts, respectively, based on 100 parts by weight of the monomeric mixture employed in the polymerization; and (b) treating the latex with an oil-soluble peroxide.

2. The process of claim 1 wherein the two-step emulsion polymerization process comprises (1) preparing a high or low molecular weight latex; and (2) preparing a low molecular weight latex in case when a high molecular weight latex was obtained in step (1), or preparing a high molecular weight latex in case when a low molecular weight latex was obtained in step (1), said step (2) being carried out in the presence of the latex prepared in step (1).

3. The process of claim 2 wherein the amount of the latex produced in step (1) is 20 to 80% based on the total weight of latices obtained in steps (1) and (2).

4. The process of claim 2 wherein the molecular weight-controlling agent is t-dodecyl mercaptan or n-dodecyl mercaptan.

5. The process of claim 1 wherein the aromatic vinylic monomer is styrene, monochlorostyrene, methylstyrene or dimethylstyrene.

6. The process of claim 1 wherein the acrylic monomer is one or more monomers selected from the group consisting of: methyl acrylate, ethyl acrylate, n-butyl acrylate, isobutyl acrylate, dodecyl acrylate, 2-ethylhexyl acrylate, methyl methacrylate, ethyl methacrylate, and n-butyl methacrylate.

7. The process of claim 1 wherein the oil-soluble peroxide is cumene hydroperoxide, diisopropyltoluene hydroperoxide, lauroyl peroxide or cymene hydroperoxide.

8. The process of claim 1 wherein the amount of the oil-soluble peroxide ranges from 0.001 to 0.50 parts by weight per 100 parts by weight of the polymer in the latex.

9. The process of claim 1 wherein the bimodal molecular weight distribution of the latex consists of a low molecular weight part having a peak molecular weight ranging from 3,000 to 20,000 daltons, and a high molecular weight part having a peak molecular weight ranging from 200,000 to 1,000,000 daltons.

* * * * *